(12) United States Patent
Berg et al.

(10) Patent No.: US 12,488,007 B2
(45) Date of Patent: *Dec. 2, 2025

(54) METHODS AND SYSTEMS FOR SOIL DATA INTERPOLATION

(71) Applicant: ADVANCED AGRILYTICS HOLDINGS, LLC, Indianapolis, IN (US)

(72) Inventors: William Kess Berg, Clayton, IN (US); Jon J. Fridgen, Lancaster, KY (US)

(73) Assignee: ADVANCED AGRILYTICS HOLDINGS, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,926

(22) Filed: Jan. 29, 2024

(65) Prior Publication Data

US 2024/0168961 A1 May 23, 2024

Related U.S. Application Data

(63) Continuation of application No. 16/983,748, filed on Aug. 3, 2020, now Pat. No. 11,886,442.

(51) Int. Cl.
  *G06F 16/20* (2019.01)
  *A01B 79/00* (2006.01)
  (Continued)

(52) U.S. Cl.
  CPC ...... *G06F 16/24575* (2019.01); *A01B 79/005* (2013.01); *G06F 16/29* (2019.01)

(58) Field of Classification Search
  CPC ..................... G06F 16/24575; G06F 16/29
  See application file for complete search history.

(56) References Cited

U.S. PATENT DOCUMENTS 10,247,717 B2   4/2019  Fang
2017/0169523 A1  6/2017  Xu et al.
2019/0250882 A1*  8/2019  Swansey ................ G06F 3/167

OTHER PUBLICATIONS

Řezník et al., Deployment and Verifications of the Spatial Filtering of Data Measured by Field Harvesters and Methods of Their Interpolation: Czech Cereal Fields between 2014 and 2018. Sensors. 2019; 19(22):4879. https://doi.org/10.3390/s19224879 [retrieved on Aug. 24, 2024]. (Year: 2019).*

(Continued)

*Primary Examiner* — Kristopher Andersen
(74) *Attorney, Agent, or Firm* — MARSHALL, GERSTEIN & BORUN LLP

(57) ABSTRACT

A method includes generating a field geospatial map layer; receiving soil data; assigning the soil data and type to a variable grid; generating interpolated soil data; and storing the interpolated soil data values in spatial data files. A computing system includes a processor; and a memory having stored thereon instructions that, when executed by the one or more processors, cause the computing system to: generate a field geospatial map layer; receive soil data; assign the soil data and type to a variable grid; generate interpolated soil data; and store the soil data in spatial data files. A non-transitory computer readable medium includes program instructions that when executed by a computer, cause the computer to: generate a field geospatial map layer; receive soil data; assign the soil data and type to a variable grid; generate interpolated soil data; and store the soil data in spatial data files.

20 Claims, 5 Drawing Sheets

(51) Int. Cl.
*G06F 16/2457* (2019.01)
*G06F 16/29* (2019.01)

(56) References Cited

OTHER PUBLICATIONS

Liu et al., Sensor nodes placement for farmland environmental monitoring applications. In Proceedings of the 5th International Conference on Wireless communications, networking and mobile computing (WiCOM'09). IEEE Press, 3193-3196 [retrieved Aug. 24, 2024]. (Year: 2009).*
Reznik et al. Interpolation of Data Measured by Field Harvesters: Deployment, Comparison and Verification. In: Athanasiadis et al. (eds) Environmental Software Systems. Data Science in Action. IFIP Advances in Information and Communication Technology, v554. https://doi.org/10.1007/978-3-030-39815-6 25 (Year: 2020).
gis.stackexchange.com, Interpolating logarithimic values—groundwater pH [retrieved Sep. 7, 2020]. Retrieved online from: https://gis.stackexchange.conn/questions/189595/interpolating-logarithinnic-values-groundwater-ph (Year: 2016).

* cited by examiner

METHODS AND SYSTEMS FOR SOIL DATA INTERPOLATION

CROSS-REFERENCE TO RELATED APPLICATIONS

The present application claims priority to U.S. application Ser. No. 16/983,748, entitled METHODS AND SYSTEMS FOR SOIL DATA INTERPOLATION, filed on Aug. 3, 2020, which is incorporated herein by reference in its entirety.

TECHNICAL FIELD

The present disclosure is generally directed to methods and systems for improving soil data interpolation, and more specifically, for collecting and interpolating point data values from an agricultural field corresponding to indexed hexagrids within a variable grid.

BACKGROUND

Existing techniques for collecting and processing point data characterize agricultural fields simplistically, leading to inaccurate agricultural data sets. Yet the inaccurate data sets are used as modeling inputs, and cause inefficient modeling predictions to be produced, leading to poor agricultural outcomes in a classic illustration of the computer science concept of "garbage in, garbage out," where flawed input data produces nonsense output.

In some cases, a data set may lack environmental variability data. Thus, conventional techniques may perform basic interpolation of soil sample data (e.g., two or more organic matter measurements), without regard to any environmental variation or spatial features present within the soil sample data, that would otherwise represent real-world variability of the agricultural field corresponding to the data set. Other conventional techniques may entirely ignore, or mistreat environmental variability information.

Because conventional techniques may not distinguish between agricultural points and non-agricultural points (e.g., a waterway, a road, a well, etc.), such techniques may inappropriately interpolate non-agricultural and agricultural data points. In some cases, the non-agricultural points may include extreme variability, leading to wildly skewed interpolated values.

BRIEF SUMMARY

In one aspect, a computer-implemented method for improving interpolation of soil data collected from an agricultural field includes (a) generating a field geospatial map layer including (1) a variable grid that subdivides the agricultural field, and (2) boundary information for the variable grid; (b) receiving a plurality of soil point data values corresponding to the agricultural field; (c) assigning each of the plurality of soil point data values and the respective type of each soil point data value to a respective grid index of the variable grid; (d) generating, via one or more processors, a plurality of interpolated soil point data values by interpolating the plurality of soil point data values, wherein the interpolating includes avoiding interpolation of one or both of (i) points having incompatible data types, and (ii) points separated by boundaries; and (e) storing the plurality of interpolated soil point data values in one or more spatial data files.

In another aspect, a computing system for improving interpolation of soil data collected from an agricultural field includes one or more processors; and one or more memories having stored thereon instructions that, when executed by the one or more processors, cause the computing system to: (a) generate a field geospatial map layer including (1) a variable grid that subdivides the agricultural field, and (2) boundary information for the variable grid; (b) receive a plurality of soil point data values corresponding to the agricultural field; (c) assign each of the plurality of soil point data values and the respective type of each soil point data value to a respective grid index of the variable grid; (d) generate, via one or more processors, a plurality of interpolated soil point data values by interpolating the plurality of soil point data values, wherein the interpolating includes avoiding interpolation of one or both of (i) points having incompatible data types, and (ii) points separated by boundaries; and (e) store the plurality of interpolated soil point data values in one or more spatial data files.

In yet another aspect, a non-transitory computer readable medium includes program instructions that when executed by a computer, cause the computer to: (a) generate a field geospatial map layer including (1) a variable grid that subdivides the agricultural field, and (2) boundary information for the variable grid; (b) receive a plurality of soil point data values corresponding to the agricultural field; (c) assign each of the plurality of soil point data values and the respective type of each soil point data value to a respective grid index of the variable grid; (d) generate, via one or more processors, a plurality of interpolated soil point data values by interpolating the plurality of soil point data values, wherein the interpolating includes avoiding interpolation of one or both of (i) points having incompatible data types, and (ii) points separated by boundaries; and (e) store the plurality of interpolated soil point data values in one or more spatial data files.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
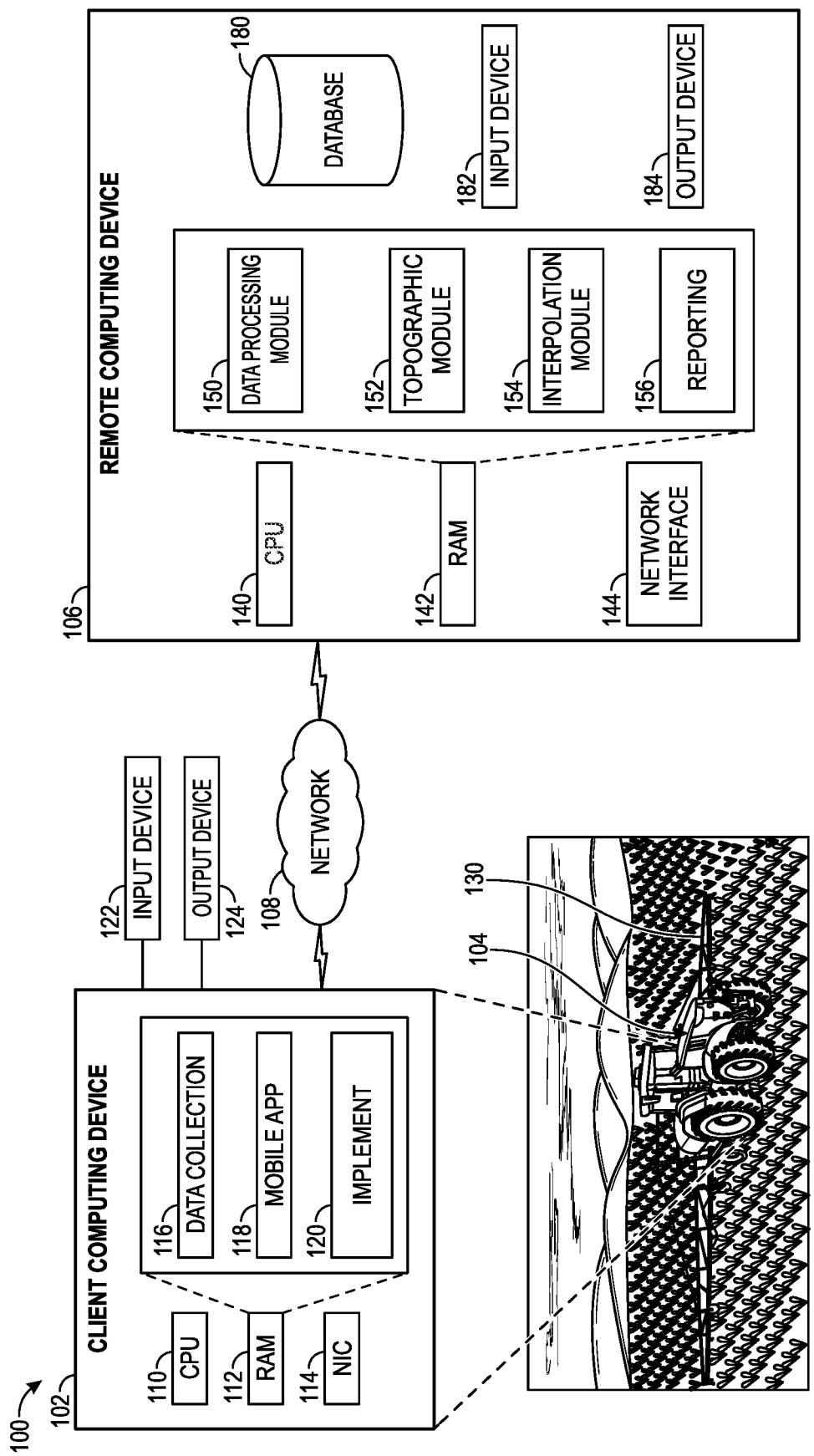
FIG. 1 depicts an exemplary computing environment for interpolating the point data samples within a variable grid, according to an embodiment.

The figures depict preferred embodiments for purposes of illustration only. One of ordinary skill in the art will readily recognize from the following discussion that alternative embodiments of the systems and methods illustrated herein may be employed without departing from the principles of the invention described herein.

DETAILED DESCRIPTION

Overview

The embodiments described herein relate to, inter alia, methods and systems for methods and systems for soil data interpolation, and more particularly, to interpolation of a plurality of values each corresponding to a respective indexed hexagrid within an indexed variable grid.

The present techniques include methods and systems for collecting machine data with respect to one or more agricultural fields and for interpolating the collected machine data. Machine data may include data generated by computerized agricultural equipment, such as sensors that are part of a tractor, combine, tiller, or other component. Machine data may include any aspect of data generated by the computerized agricultural equipment, including without limitation, engine load data, fuel burn data, draft sensing, fuel consumption, wheel slippage, etc. In some embodiments, machine data may correspond to soil attributes of a soil sample (e.g., soil pH). The agricultural field may be subdivided into a variable grid and/or by one or more hexagrids, wherein each subdivision corresponds to a data point having one or more values.

In some embodiments, the present techniques may analyze the machine data to generate an interpolated data set stored in one or more spatial data files. The interpolation process may include comparing two or more values from two or more data points. The spatial data files may be encoded in a suitable file format, such as a commercial or open source shapefile, a GeoJSON format, a Geography Markup Language (GML) file, etc. Such spatial data files may include one or more layers (i.e., map layers, wherein each layer represents an agricultural characteristic. For example, soil pH may be represented by one or more layers within a shapefile. The individual layer(s) and/or files may be shared between multiple computing devices of an agricultural company, provided or sold to customers, stored in a database, etc.

In some embodiments, the spatial data files and interpolated data therein may be further analyzed for predictive purposes (e.g., to generate an agricultural prescription). The spatial data files may be compared to existing spatial data (e.g., spatial data from a public source) to identify congruencies and/or differences. For example, the agricultural company may advantageously use the interpolated data to generate more appropriate agricultural prescriptions for use by growers (e.g., in automated growing software), thereby improving crop yield. In some embodiments, the present techniques may include analyzing the interpolated data using one or more agrilytics models and/or displaying visualizations to the user.

Exemplary Computing Environment

FIG. 1 depicts an exemplary computing environment 100 in which the techniques disclosed herein may be implemented, according to an embodiment. The environment 100 includes a client computing device 102, an implement 104, a remote computing device 106, and a network 108. Some embodiments may include a plurality of client computing devices 102, a plurality of implements, and/or a plurality of remote computing devices 106. Multiple and/or separate networks may communicatively couple different components, such as the client computing device 102 and the implement 104, and/or the client computing device 102 and the remote computing device 106.

The client computing device 102 may be an individual server, a group (e.g., cluster) of multiple servers, or another suitable type of computing device or system (e.g., a collection of computing resources). For example, the client computing device 102 may be a mobile computing device (e.g., a server, a mobile computing device, a smart phone, a tablet, a laptop, a wearable device, etc.). In some embodiments the client computing device 102 may be a personal portable device of a user. In some embodiments the client computing device 102 may be temporarily or permanently affixed to the implement 102. For example, the client computing device 102 may be the property of a customer, an agricultural analytics (or "agrilytics") company, an implement manufacturer, etc.

The client computing device 102 includes a processor 110, a memory 112 and a network interface controller (NIC) 114. The processor 110 may include any suitable number of processors and/or processor types, such as CPUs and one or more graphics processing units (GPUs). Generally, the processor 110 is configured to execute software instructions stored in a memory 112. The memory 112 may include one or more persistent memories (e.g., a hard drive/solid state memory) and stores one or more sets of computer executable instructions/modules, including a data collection module 116, a mobile application module 118, and an implement control module 120, as described in more detail below. More or fewer modules may be included in some embodiments. In some embodiments certain operations (e.g., an interpolation of two data points corresponding to a variable grid) may be performed in the client computing device 102. The NIC 114 may include any suitable network interface controller(s), such as wired/wireless controllers (e.g., Ethernet controllers), and facilitate bidirectional/multiplexed networking over the network 108 between the client computing device 102 and other components of the environment 100 (e.g., another client computing device 102, the implement 104, the remote computing device 106, etc.).

The one or more modules stored in the memory 112 may include respective sets of computer-executable instructions implementing specific functionality. For example, in an embodiment, the data collection module 116 includes a set of computer-executable instructions for collecting a machine data set from an implement (e.g., the implement 104). The machine data collection module 116 may include a respective set of instructions for retrieving/receiving data from a plurality of different implements. For example, a first set of instructions may be for retrieving/receiving machine data from a first soil probe manufacturer, while a second set of instructions is for retrieving/receiving machine data from a second soil probe manufacturer. In another embodiment, the first and second set of instructions may be for, respectively, receiving/retrieving data from a tiller, a harvester, a tractor, etc. Of course, some libraries of instructions executed in the data collection module 116 may be provided by the manufacturers of various implements and/or attachments, and may be loaded into the memory 112 and used by the data collection module 116. The data collection module 116 may retrieve/receive machine data from a separate hardware device (e.g., a client computing device 102 that is part of the implement 104) or directly from one or more of the sensors of the implement 104 and/or one or more of the attachments 130 coupled to the implement 104, if any.

The machine data may include any information generated by the client computing device 102, the implement 104, and/or the attachments 130. For example, the machine data may include soil probe data from one or more soil probes. The soil probe data may relate to a core sample collected by an auger, for example (e.g., a mud auger, a soil auger, a sand auger, etc.). The soil probe data may include soil data generated by an electronic soil sampling device (e.g., a digital pH meter). The machine data may include a time series of soil probe data, such as a time series of soil organic matter (OM) values generated while the implement 104 works a grower's field. In some embodiments, the machine data may include sensor measurements of engine load data, fuel burn data, draft, fuel consumption, wheel slippage, etc. time series may measure represented measured values at an interval (e.g., one-second).

The machine data is location-aware. For example, the client computing device 102 may add location metadata to the machine data, such that the machine data reflects an absolute and/or relative geographical position (i.e., location, coordinate, offset, heading, etc.) of the client computing device 102, the implement 104, and/or the attachments 130 within the agricultural field with respect to a variable grid and/or one or more hexagrids within the variable grid, at the precise moment that the client computing device 102 captures the machine data. It will also be appreciated by those of ordinary skill in the art that some sensors and/or agricultural equipment may generate machine data received by the client computing device 102 that already includes location metadata added by the sensors and/or agricultural equipment. In an embodiment wherein the machine data comprises a time series, each value of the time series may include a respective geographic metadata entry.

The data collection module 116 may receive and/or retrieve the machine data via an API through a direct hardware interface (e.g., via one or more wires) and/or via a network interface (e.g., via the network 108). The data collection module 116 may collect (e.g., pull the machine data from a data source and/or receive machine data pushed by a data source) at a predetermined time interval. The time interval may be of any suitable duration (e.g., once per second, once or twice per minute, every 10 minutes, etc.). The time interval may be short, in some embodiments (e.g., once every 10 milliseconds). The data collection module 116 may include instructions for modifying and/or storing the machine data. For example, the data collection module 116 may parse the raw machine data into a data structure. The data collection module 116 may write the raw machine data onto a disk (e.g., a hard drive in the memory 112). In some embodiments, the data collection module 116 may transfer the raw machine data, or modified machine data, to a remote computing system/device, such as the remote computing device 106. The transfer may, in some embodiments, take the form of an SQL insert command. In effect, the data collection module 116 performs the function of receiving, processing, storing, and/or transmitting the machine data.

In an embodiment, the client computing device is not used to collect machine data from the implement 104 directly. In such an embodiment, the implement 104 may collect a plurality of soil samples corresponding to the agricultural field. The implement 104 may store the soil samples in order (e.g., in a soil sample storage attachment 130). Once the soil samples are collected, a computing device (e.g., the remote computing device) may receive machine data collected from the client computing device 102, wherein the client computing device 102 is implemented as a device not linked to the implement 104. For example, the client computing device 102 may be an electronic soil probe device used to sample the samples collected in the soil sample storage attachment 130 after the grower has driven the field to collect the samples.

The mobile application module 118 may include computer-executable instructions that display one or more graphical user interfaces (GUIs) on the output device 124 and/or receive user input via the input device 122. For example, the mobile application module 118 may correspond to a mobile computing application (e.g., an Android, iPhone, or other) computing application of an agrilytics company. The mobile computing application may be a specialized application corresponding to the type of computing device embodied by the client computing device 102. For example, in embodiments where the client computing device 102 is a mobile phone, the mobile application module 118 may correspond to a mobile application downloaded for iPhone. When the client computing device 102 is a tablet, the mobile application module 118 may correspond to an application with tablet-specific features. Exemplary GUIs that may be displayed by the mobile application module 118, and with the user may interact, are discussed below. The mobile application module 118 may include instructions for receiving/retrieving mobile application data from the remote computing device 106. In particular, the mobile application module 118 may include instructions for transmitting user-provided login credentials, receiving an indication of successful/unsuccessful authentication, and other functions related to the user's operation of the mobile application. The mobile application module 118 may include instructions for receiving/retrieving, rendering, and displaying visual maps in a GUI. Specifically, the application module 118 may include computer-executable instructions for displaying one or more map layers in the of the client computing device 102.

The implement control module 120 may include computer-executable instructions for controlling the operation an implement (e.g., the implement 104) and/or the attachments 130. The implement control module 120 may control the implement 104 while the implement 104 and/or attachments 130 are in motion (e.g., while the implement 104 and/or attachments 130 are being used in a farming capacity). For example, the implement control module 120 may include an instruction that, when executed by the processor 110 of the client computing device 102, causes the implement 104 to accelerate or decelerate. In some embodiments, the implement control module 120 may cause one of the attachments 130 to actuate a soil probe, or to apply more or less downward or upward pressure/thrust on the ground. Practically, the implement control module 120 has all of the control of the implement 104 and/or attachments 130 as does the human operator. The implement control module 120 may include a respective set of instructions for controlling a plurality of implements. For example, a first set of instructions may be for controlling an implement of a first tractor manufacturer, while a second set of instructions is for controlling an implement of a second tractor manufacturer. In another embodiment, the first and second set of instructions may be for, respectively, controlling a soil probe device and a harvester. Of course, many configurations and uses are envisioned beyond those provided by way of example. The control module 120 may include computer-executable instructions for executing one or more agricultural prescriptions with respect to a field. For example, the control module 120 may execute an agricultural prescription that specifies, for a given agricultural field, a path for the implement 104 to follow within the field, and a varying application rate of a chemical (e.g., a fertilizer, an herbicide, a pesticide, etc.)

or a seed to apply at various points along the path. The control module 120 may analyze the current location of the implement 104 and/or the attachments 130 in real-time (i.e., as the control module 120 executes the agricultural prescription). The control module 120 may include instructions for operating the implement 104 with respect to one or more boundaries (e.g., a road, a real property border, a waterway, a well, etc.). In some embodiments, the one or more boundaries may be geofenced, as described herein.

The client computing device 102 includes an input device 122 and an output device 124. The input device 122 may include any suitable device or devices for receiving input, such as one or more microphones, one or more cameras, a hardware keyboard, a hardware mouse, a capacitive touch screen, etc. The output device 124 may include any suitable device for conveying output, such as a hardware speaker, a computer monitor, a touch screen, etc. In some cases, the input device 122 and the output device 124 may be integrated into a single device, such as a touch screen device that accepts user input and displays output. The client computing device 102 may be associated with (e.g., leased, owned, and/or operated by) an agrilytics company.

In some embodiments, the memory 112 may include an application display module for displaying information received/retrieved from a remote computing device (e.g., the remote computing device 104) and for processing/transmitting user inputs. Specifically, the application display module may include computer-executable instructions for receiving data from the input device 122 of the client computing device 102, for displaying data via the output device 124 of the client computing device 102, and for transmitting the input to a remote computing device (e.g., the remote computing device 104) via the network 106. The application display module may render one or more graphical user interfaces. For example, the input data may include a request to access a web page, such as a customer information web page.

In some embodiments, one or more components of the computing device 102 may be embodied by one or more virtual instances (e.g., a cloud-based virtualization service). In such cases, one or more client computing devices 102 may be included in a remote data center (e.g., a cloud computing environment, a public cloud, a private cloud, etc.). For example, a remote data storage module (not depicted) may remotely store data received/retrieved by the computing device 102. The client computing device 102 may be configured to communicate bidirectionally via the network 108 with the implement 104 and/or an attachments 130 that may be coupled to the implement 104. The implement 104 and/or the attachments 130 may be configured for bidirectional communication with the client computing device 102 via the network 108.

The client computing device 102 may receive/retrieve data (e.g., machine data) from the implement 104, and/or the client computing device 102 may transmit data (e.g., instructions) to the implement 104. The client computing device 102 may receive/retrieve data (e.g., machine data) from the attachments 130, and/or may transmit data (e.g., instructions) to the attachments 130. The implement 104 and the attachments 130 will now be described in further detail.

The implement 104 may be any suitable powered or unpowered equipment/machine or machinery, including without limitation: a soil prober, a soil collector, a tractor, a combine, a cultivator, a cultipacker, a plow, a harrow, a stripper, a tiller, a planter, a baler, a sprayer, an irrigator, a sorter, an harvester, etc. The implement 104 may include one or more sensors (not depicted) and the implement 104 may be coupled to one or more attachments 130. For example, the implement 104 may include one or more sensors for measuring soil pH, and/or for measuring respective implement values of engine load data, fuel burn data, draft sensing, fuel consumption, wheel slippage, etc. Many embodiments including more or fewer sensors measuring more or fewer implement values are envisioned. The implement 104 may be a gas/diesel, electric, or hybrid vehicle operated by a human operator and/or autonomously (e.g., as an autonomous/driverless agricultural vehicle).

The attachments 130 may be any suitable powered or unpowered equipment/machinery permanently or temporarily affixed/attached to the implement 104 by, for example, a hitch, yoke or other suitable mechanism. The attachments 130 may include any of the types of equipment that the implement 104 may comprise (e.g., a soil prober). The attachments 130 may include one or more sensors (not depicted) that may differ in number and/or type according to the respective type of the attachments 130 and the particular embodiment/scenario. For example, a soil prober attachment 130 may include one or more soil depth sensors. It should be appreciated that many attachments 130 sensor configurations are envisioned. For example, the attachments 130 may include one or more cameras. The attachments 130 may be connected to the implement 104 via wires or wirelessly, for both control and communications. For example, attachments 130 may be coupled to the client computing device 102 of the implement 104 via a wired and/or wireless interface for data transmission (e.g., IEEE 802.11, WiFi, etc.) and main/auxiliary control (e.g., 7-pin, 4-pin, etc.). The client computing device 102 may communicate bidirectionally (i.e., transmit data to, and/or receive data from) with the remote computing device 106 via the network 108.

The network 108 may be a single communication network, or may include multiple communication networks of one or more types (e.g., one or more wired and/or wireless local area networks (LANs), and/or one or more wired and/or wireless wide area networks (WANs) such as the Internet). The network 108 may enable bidirectional communication between the client computing device 102 and the remote computing device 106, or between multiple client computing devices 102, for example.

The remote computing device 106 includes a processor 140, a memory 142, and a NIC 144. The processor 140 may include any suitable number of processors and/or processor types, such as CPUs and one or more graphics processing units (GPUs). Generally, the processor 140 is configured to execute software instructions stored in the memory 142. The memory 142 may include one or more persistent memories (e.g., a hard drive/solid state memory) and stores one or more sets of computer executable instructions/modules, as discussed below. For example, the remote computing device 106 may include a data processing module 150, a topographic module 152, a mapping module 154, and an interpolation module 156. The NIC 144 may include any suitable network interface controller(s), such as wired/wireless controllers (e.g., Ethernet controllers), and facilitate bidirectional/multiplexed networking over the network 106 between the remote computing device 106 and other components of the environment 100 (e.g., another remote computing device 106, the client computing device 102, etc.).

The one or more modules stored in the memory 142 may include respective sets of computer-executable instructions implementing specific functionality. For example, in an embodiment, the data processing module 150 includes computer-executable instructions for receiving/retrieving data from the client computing device 102, the implement 104, and/or the attachments 130. For example, the data processing module 150 may include instructions that when executed by the processor 140, cause the remote computing device 106 to receive/retrieve machine data. The data processing module 150 may include further instructions for storing the machine data in one or more tables of the database 180. The data processing module 150 may store raw machine data and/or processed data. The data processing module 150 may include instructions for processing the raw machine data to generate processed data. For example, the processed data may be data that is represented using data types data of a programming language (e.g., R, C#, Python, JavaScript, etc.). The data processing module 150 may include instructions for validating the data types present in the processed data. For example, the data processing module 150 may verify that a value is present (i.e., not null) and is within a particular range or of a given size/structure. In some embodiments, the data processing module 150 may include instructions for converting pH values to other related values (e.g., Hydrogen ion concentration).

In some embodiments, the data processing module 150 may transmit processed data from the database 180 in response to a query, or request, from the client computing device 102. The data processing module 150 may transmit the processed data via HTTP or via another data transfer suitable protocol.

The topographic module 152 may include instructions for retrieving and/or providing spatial data (e.g., one or more map layers) to other modules in the remote computing device 106. Generally, spatial data comprises data that associates land (e.g., an agricultural field) with other information (e.g., a boundary, an elevation, etc.) in two or more dimensions. For example, the topographic module 152 may retrieve elevation data from the database 180. The topographic module 152 may source elevation data from public sources, such as the United States Geological Survey (USGS) National Elevation Dataset (NED) database. In some embodiments, the data processing module 150 may provide raw data to the topographic module 152, wherein instructions within the topographic module 152 infer information regarding the plot of land by analyzing the raw data. For example, the topographic module 152 may convert geo-tagged machine data including a plurality of point-wise values with respective points within a variable grid.

Specifically, the topographic module 152 may include spatial data including one or more geofenced regions. Specifically, the geofence may include a list of coordinates relative to the map layer that spatially determine where objects (e.g., field boundaries, waterways, roads, wells, etc.) are located. The one or more geofenced regions may overlap in some embodiments. The spatial data may be stored in a two-dimensional (2D) or three-dimensional (3D) data format, depending on the embodiment and scenario. In some embodiments, the client computing device 102 may include a global positioning satellite (GPS) module or another location-based technology now known or later developed that allows that client computing device 102 to determine its position relative to a grower's field. For example, the mobile application module 118 may determine that the client computing device 102 and/or the implement 104 is located within one or more of the geofenced regions. A module of the client computing device 102 (e.g., the implement control module 120) and/or the remote computing device 106 (e.g., the interpolation module 154) may cause the implement 104 and/or the attachment 130 to perform a function based on the determined position. For example, the implement control module 120 may cause the attachment 130 to activate a sprayer, lower a boom arm, actuate a soil sample probe, etc.

In some embodiments, the topographic module 152 may invert the geofencing, such that the spatial data stores one or more geofenced regions that correspond to arable land, and areas outside the geofenced regions correspond to non-agricultural features of the land (e.g., a waterway, a well, a road, etc.). In such embodiments, the present techniques may include instructions for avoiding interpolation of data within points that fall outside the geofenced regions.

In some embodiments, the topographic module 152 may generate one or more map layers and/or one or more geospatial data files (e.g., shapefiles). The topographic module 152 may store the generated map layers and/or geospatial files in the database 180, or in the memory 142. The topographic module 152 may provide the geospatial files and/or map layers to other components of the environment 100, such as the implement control module 120. The topographic module 152 may allow third-party access to the map layers via an API. The topographic module 152 may combine one or more data sets from the database 180 into a single map layer/geospatial file, or into multiple respective map layers. For example, the mapping module 156 may generate a composite geospatial data file that includes a first map layer representing the elevation of the agricultural field, and a second map layer representing each boundary within the agricultural field. When, for example, the mobile application module 118 retrieves the composite geospatial data file, the mobile application module 118 may display the first map layer and/or the second map layer either independently or in an overlay view. In this way, the user is able to attain a clear visualization of the boundaries within the field, and, for example, operate the implement 104 so as to avoid them.

In some embodiments, the topographic module 152 may identify boundary information by analyzing the map layer. For example, the topographic module 152 may cause the map layer to be subdivided into a variable grid, as depicted below. The variable grid may correspond to point data, wherein each of the point data includes a type attribute corresponding to the type of the point (e.g., a field type, a boundary type, a waterway type, etc.). In some embodiments, the type attribute may be a Boolean value (e.g., a boundary/non-boundary attribute). The interpolation module 154 may analyze the type attribute of each point within the point data when performing interpolation, to avoid interpolating points having incompatible types.

The interpolation module 154 may include instructions for interpolating two or more points corresponding to a variable grid with respect to an agricultural field. In an embodiment, the interpolation module 154 includes instructions implementing a soil data interpolation algorithm. The soil data interpolation algorithm may include analyzing machine data and/or soil probe data. The soil data interpolation algorithm may identify points from the soil probe data relating to a variable grid representing the grower's field. For example, the agrilytics company may sample the field on an acre-by-acre basis (e.g., every two acres, every 0.4 acres, etc.). Each sample may include point data representing a number of points within the field (e.g., 50 points). In some embodiments, the soil data interpolation algorithm may analyze a coarse soil data set.

As noted, the interpolation module 154 may include instructions that cause the interpolation module 154 to only interpolate those points that may be interpolated. For example, the interpolation module 154 may include instructions that prevent a first point having a boundary type attribute with a second point having a field type attribute.

The soil data interpolation algorithm may analyze the field using a geometric structure (e.g., an 8.5-meter hexagrid). The soil data interpolation algorithm may include one or more mathematical interpolation techniques for computing representative soil data values (e.g., organic matter) at each hexagrid cell. In some embodiments, the soil data interpolation algorithm may include using a kriging or Gaussian process regression approach. In some embodiments, the soil data interpolation algorithm may include an inverse distance weighted and/or spatial copula interpolation technique.

The soil data interpolation algorithm may include analyzing spatial constraints of the field. For example, the interpolation module 154 may receive/retrieve spatial data from the topographic module 152 including one more boundaries (e.g., a farm house, a drive way, etc.). The interpolation module 154 may include instructions for restricting a search neighborhood of points only to those points within the variable grid that do not intersect with the boundaries. By analyzing only those machine data points that do not correspond to and/or intersect with boundary points, the interpolation module 154 advantageously avoids the industry standard approach of interpolating point data as is, with no constraints, across an entire agricultural field. Therefore, the present techniques advantageously result in interpolated data sets that are much more accurate and do not include large error caused by interpolating boundary data, for example.

In some embodiments, the interpolation module 154 includes instructions for interpolating points according to environmental characteristics. For example, when a grower applies a product to a field (e.g., a fertilizer) the grower may begin application at a first location (e.g., a field entrance), and end application at a second location (e.g., a field exit). The implement may spread the product at all points in between the first location and the second location. The implement (e.g., a spreader tank) may be most full product at the first location and least full of product at the second location. At points between the first and second location, the spreader tank may include less and less product as the implement continuously spreads. Those of ordinary skill in the art will appreciate that later interpolation of machine data corresponding to the first location or the second location may result in skew that may be caused by, for example, improper representation of spatial dependence in an environmental characteristic/attribute. The interpolation module 154 may include instructions for analyzing the distribution of machine data point values to avoid interpolating machine data points corresponding to areas of the field likely to skew interpolation results.

The reporting module 156 may include computer-executable instructions for generating a field assessment report and/or for generating an agricultural prescription. Soil data is a key input for agrilytics algorithms and data modeling/analytics tools. For example, the point data values of organic matter within a field are important for determining variable rate seeding and variable rate nitrogen prescriptions for grain, oilseed and/or fiber crops, and are foundational for other precision agriculture algorithms and field data mining. As such, the present techniques advantageously generate raw data that improve the accuracy of modeling approaches by eliminating the faulty input problem discussed above in the context of conventional interpolation approaches.

In addition, the present techniques allow for more accurate reporting to be generated and provided for human consumption. Specifically, an agricultural analytics company may analyze a grower's fields using the present techniques, to generate one or more interpolated data sets. The analysis may be generated by the data processing module 150, for example, and stored in the database 180. The reporting module 156 may retrieve the results of such analysis and generate actionable reports for the grower. For example, the report may be a digital object (e.g., a PDF file, a shape file, etc.) including a visual representation of interpolated data points. The grower may inspect the visual report to determine information corresponding to the field (e.g., yield).

The remote computing device 106 may further include one or more databases 180, an input device 182, and an output device 184. The database 180 may be implemented as a relational database management system (RDBMS) in some embodiments. For example, the data store 140 may include one or more structured query language (SQL) databases, a NoSQL database, a flat file storage system, or any other suitable data storage system/configuration. In general, the database 180 allows the client computing device 102 and/or the remote computing device 106 to create, retrieve, update, and/or retrieve records relating to performance of the techniques herein. For example, the database 180 may allow the client computing device 102 to store information received from one or more sensors of the implement 104 and/or the attachments 140. The database 180 may include a Lightweight Directory Access Protocol (LDAP) directory, in some embodiments. The client computing device 102 may include a module (not depicted) including a set of instructions for querying an RDBMS, an LDAP server, etc. For example, the client computing device 102 may include a set of database drivers for accessing the database 180 of the remote computing device 106. In some embodiments, the database 180 may be located remotely from the remote computing device 104, in which case the remote computing device 104 may access the database 180 via the NIC 112 and the network 106.

The input device 182 may include any suitable device or devices for receiving input, such as one or more microphones, one or more cameras, a hardware keyboard, a hardware mouse, a capacitive touch screen, etc. The input device 182 may allow a user (e.g., a system administrator) to enter commands and/or input into the remote computing device 106, and to view the result of any such commands/input in the output device 184.

The output device 184 may include any suitable device for conveying output, such as a hardware speaker, a computer monitor, a touch screen, etc. The remote computing device 106 may be associated with (e.g., leased, owned, and/or operated by) an agrilytics company. As noted above, the remote computing device 106 may be implemented using one or more virtualization and/or cloud computing services. One or more application programming interfaces (APIs) may be accessible by the remote computing device 106.

Exemplary Computer-Implemented Variable Grid

Figure 2:
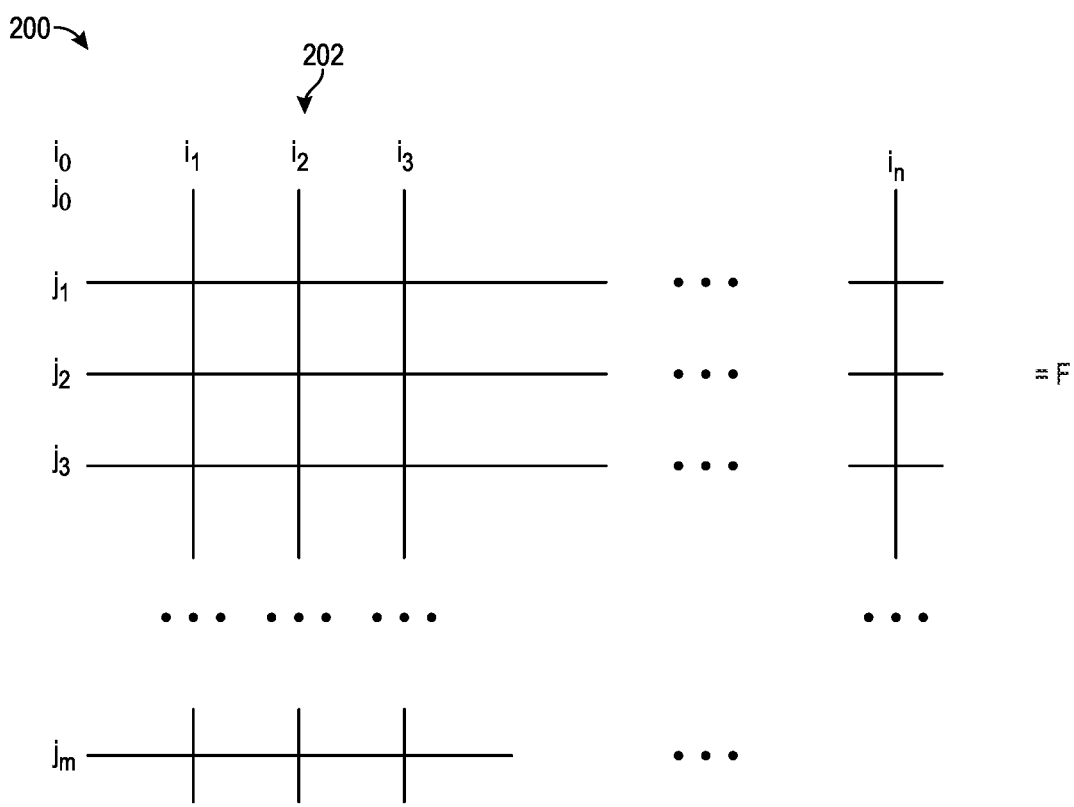
FIG. 2 depicts an exemplary indexed variable grid, according to one embodiment.

FIG. 2 depicts an exemplary computer-implemented indexed variable grid 200, according to one embodiment. The indexed variable grid 200 includes indices 202 that may correspond to a two-dimensional agricultural field. In the depicted example, the indices 202 include vertical axes $i_0$ through in and horizontal indices $j_0$ through $j_m$, wherein n and m may be, respectively, any positive integer. The indexed variable grid 200 is depicted using equidistant squares, but other shapes may be used in some embodiments (e.g., an hexagrid). In some embodiments, the indexed variable grid 200 may not be composed of equidistant squares. Instead, the indexed variable grid 200 may include vertical striping, such that some columns of the indexed variable grid 200 are of different size (e.g., odd-numbered columns may be of width 2, while even-numbered columns are of width 3). It should be appreciated that many spatial configurations for the indexed variable grid 200 are envisioned.

Figure 3:
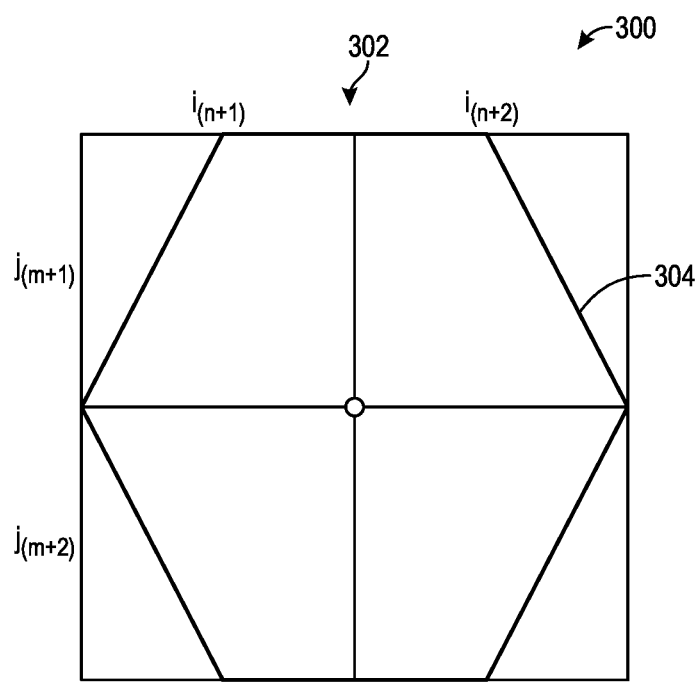
FIG. 3 depicts an exemplary hexagrid cell, according to one embodiment.

Further, while the indexed variable grid 200 depicts a two-dimensional grid, some embodiments include one or more additional indices/dimensions (e.g., a third index/dimension k, representing elevation). The scale of the variable grid 200 may be any suitable size (e.g., each point i,j may correspond to 16 m$^2$). In some embodiments, one or more cells of the indexed variable grid 200, referenced by a pair of vertical and horizontal indices 202, may correspond to a larger structure (e.g., the hexagrid), as depicted in FIG. 3. The hexagrid 304 may be depicted as oriented, or rotated 90 degrees, in some embodiments.

In general, dividing the agricultural field using the variable grid 200 allows the agricultural field to be referenced according to the indices 202. The variable grid 200 is available to the implement 104 during a sample collection phase and/or during a product application phase. Therefore, a module (e.g., the data collection module 116) may include instructions for tagging machine data with a vertical index and a horizontal index corresponding to the location within the agricultural field from which the implement 104 and/or attachment 130 collects a sample. In some embodiments, the assignment of variable grid indices to a soil sample is performed by the data collection module 116. In other embodiments, another module (e.g., the data processing module 150) assigns indices to the collected/received machine data.

Exemplary Computer-Implemented Hexagrid Tiling

FIG. 3 depicts an exemplary grid cell 300 including a plurality of indexed squares 302 over which an hexagrid cell 304 is superimposed, or tiled, according to one embodiment. The hexagrid cell 304 may be of any suitable size for tiling the variable grid 200. For example, the hexagrid cell 304 may cover two vertical and two horizontal indices, as depicted in FIG. 3. In some embodiments, the hexagrid cell 304 may be of height 1 and width 1, for example covering the cell $i_{(n+1)}$, $j_{(m+1)}$. In some embodiments, each of the indexed squares 302 may correspond to respective cells within the variable grid 200. Each hexagrid cell 304 may include an index, as depicted in FIG. 4.

Figure 4:
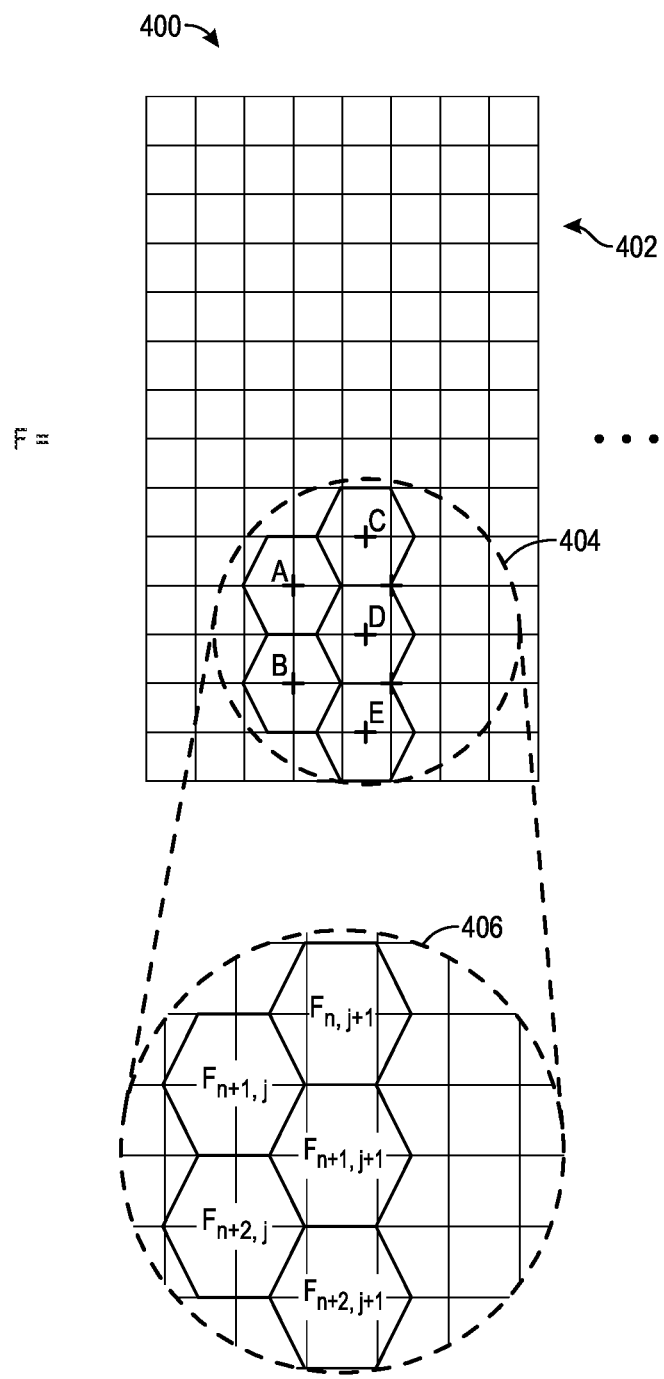
FIG. 4 depicts an exemplary indexed variable grid including a plurality of indexed hexagrid cells, according to an embodiment.

FIG. 4 depicts an exemplary indexed variable grid 400 including a plurality of indexed hexagrid cells 402 corresponding to a field F, according to an embodiment. For example, a select subset 404 includes relative indices A-F. Each of the relative indices A-F may correspond to indices relative to the field F within a subset of hexagrids 406. FIG. 4 illustrates, inter alia, that the subset of hexagrids 406 may be selected from within the indexed variable grid 400 and individually referenced according to indices relative to the selected set and/or according to indices relative to the field F via coordinates corresponding to the indexed variable grid.

Exemplary Computer-Implemented Variable Grid Interpolation

As noted above, industry standard techniques for collecting and processing point data characterize agricultural fields simplistically, leading to inaccurate agricultural data sets, and then go on to base predictions and other analysis on such simplistic characterizations. Existing techniques fail to take into account environmental variability information, or simply ignore/mistreat available environmental variability data.

Figure 5:
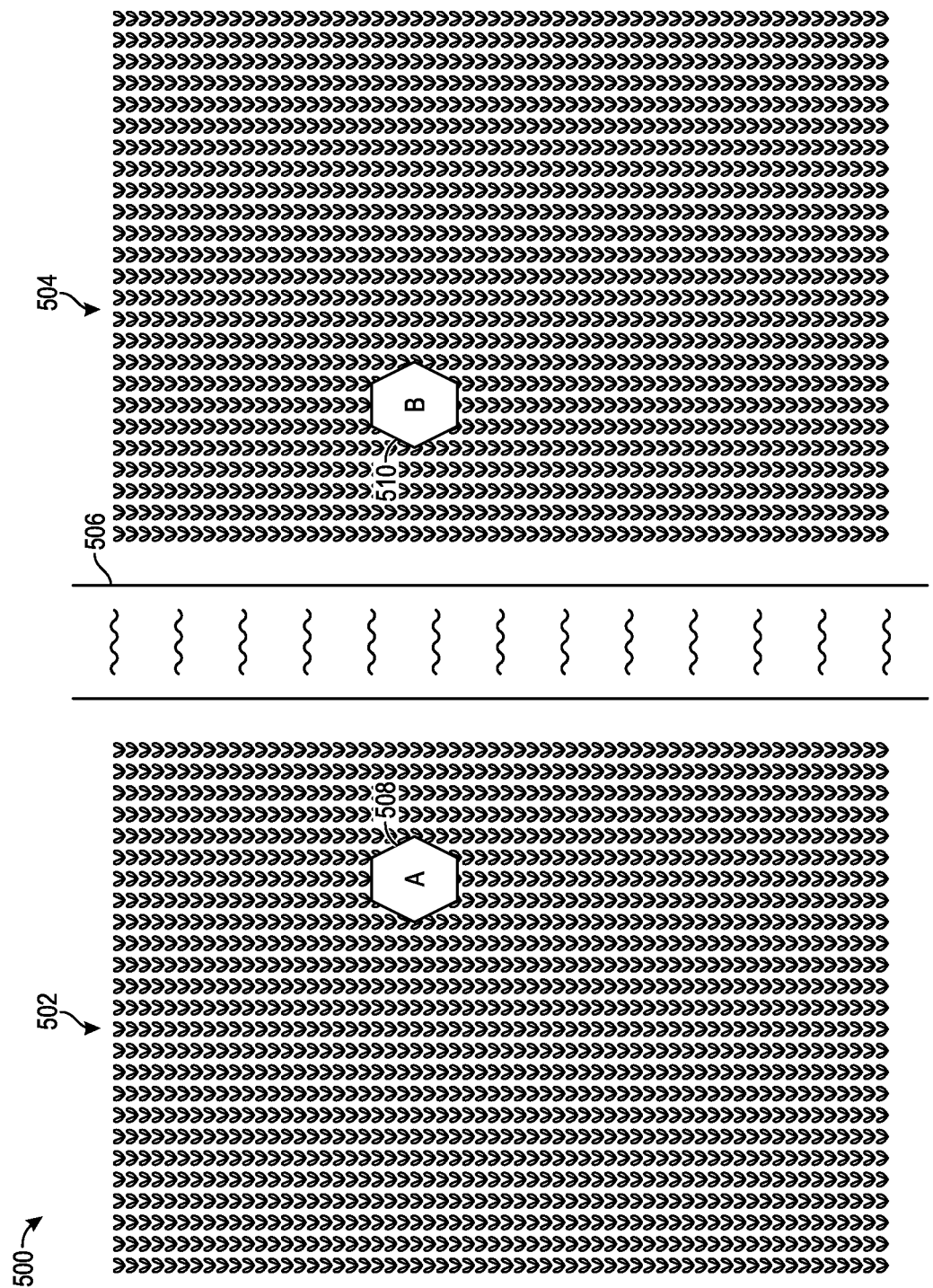
FIG. 5 depicts an exemplary indexed variable grid comprising a plurality of indexed hexagrids, according to one embodiment and scenario.

FIG. 5 depicts an exemplary indexed variable grid 500 including a first region 502, a second region 504 and a boundary 506. The indexed variable grid 500 may correspond to the indexed variable grid 200 and/or the indexed variable grid 400, in some embodiments. The first region 502 may include a first hexagrid 508 adjacent to the boundary 506. The second region 504 may include a second hexagrid 510 adjacent to the boundary 506. The first hexagrid 508 and the second hexagrid 510 may correspond to agricultural points (i.e., points upon which crops are planted) while the boundary 506 corresponds to a non-agricultural point (e.g., a paved or unpaved road, a waterway, a well, an irrigation channel, etc.).

The boundary 506 may be geofenced. A geofence may be a virtual geographic boundary, defined by global positioning satellite (GPS) or other location-based technology. The variable grid 500 may include one more geofenced region (e.g., the boundary 506) wherein the geofence is included in a map layer.

Generally, sampling may produce point values corresponding to organic matter, soil texture, pH, cation-exchange capacity (CEC), sand/soil/clay characterizations, etc. of the field corresponding to the variable grid 500. A sampling data set corresponding to the first region 502 may include representative values for the first hexagrid 508. The sampling data set may include representative values for the second hexagrid 510. Therefore, interpolating values between the first hexagrid 508 and the second hexagrid 510 may produce useful and valuable results.

However, the sampling data set may not include values corresponding to the boundary 506, or may include values that, when interpolated with values of the hexagrid 508 and/or hexagrid 510, produce skewed/inaccurate output. For example, in a conventional interpolation technique, the point data of the first hexagrid 508 may be interpolated with the point data of the boundary 506, and the point data of the second hexagrid 510 may be interpolated with the point data of the boundary 506. Such interpolation strategies may produce highly inaccurate/misleading results. Thus, the present techniques improve conventional interpolation techniques by identifying the boundary 506 and adjusting the interpolation of points including the boundary 506, so as to avoid interpolation of incompatible point data.

As noted above, in some embodiments, the hexagrid 508 may correspond to an application start location, while the hexagrid 510 corresponds to an application ending location. As such, the point data of the hexagrid 508 and the hexagrid 510 may be discarded or smoothed using surrounding data, to avoid interpolating points wherein relatively large or small amounts of product are applied. In such cases, the interpolation module 154 may determine whether two points may be interpolated by analyzing information other than the point type. For example, the interpolation module may allow interpolation of the hexagrid 508 and the hexagrid 510 when a respective nitrogen level of the hexagrid 508 and the hexagrid 510 is within a predetermined range. Such a rule may be a filter, and many such filters may be stored in the interpolation module 154. It will be appreciated by those of ordinary skill in the art that growers are able to determine by sight those areas of a field that are start/stop locations for field application products. Therefore, in some embodiments, the grower may set the predetermined range by visually assessing the field and selecting a point within the variable grid 500. For example, the variable grid 500 may be displayed in a display device wherein the grower may select one or more hexagrids to include/exclude in an interpolation.

Exemplary Computer-Implemented Potential for Hydrogen Interpolation

Conventional interpolation techniques that compute the hydrogen ion activity (pH) of agricultural fields perform crude and inaccurate calculations. Specifically, when interpolating pH values of agricultural fields, conventional techniques interpolate pH values by using actual pH values (e.g., by computing an average). Because pH is measured using a logarithmic scale, a more accurate interpolation technique includes computing pH values within point data to hydrogen ion activity (i.e., hydrogen concentration), interpolating these concentrations, and then converting the interpolated information back to a pH value. Potential for hydrogen information is currently used to determine the amount of product (e.g., Calcium carbonate) to apply to a field for a particular purpose (e.g., to raise pH). When pH values are merely averaged during interpolation, the crude resulting data may cause the grower to apply too much or too little of the product. In general, careless information science practices have resulted in small errors in pH measurement that are currently multiplied across many conventional products, leading to large measurement error in the agriculture industry.

Therefore, the interpolation module 154 may include instructions that convert the pH values of two points (e.g., point data from the hexagrid 508 and point data from the hexagrid 510) to respective hydrogen ion concentrations. The instructions may further interpolate the hydrogen ion concentrations using the techniques discussed herein, and convert the interpolated hydrogen ion concentration into an interpolated pH. The interpolation module 154 may assign the interpolated pH value to one or more points in the variable grid 500. Then, the interpolated pH value may cause an automated product application system to apply a product in a more precise and granular manner, wasting less product and resulting in better growing yields. It will be appreciated by those of ordinary skill in the art that interpolated soil data is an important input for many digital agriculture model processes/systems, including pH adjustment methods, variable-rate seeding (e.g., for soy, corn, etc.) methods, variable-rate nitrogen methods, etc. The present techniques cause such methods and systems to perform more efficiently, by generating more accurate modeling inputs.

Exemplary Methods

Figure 6:
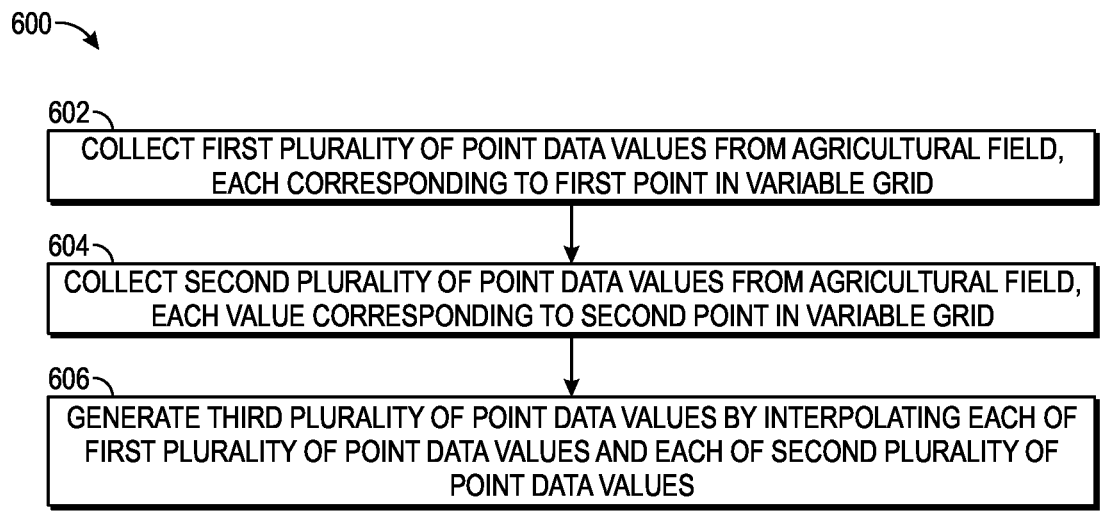
FIG. 6 depicts an exemplary computer-implemented method for interpolating a plurality of values each corresponding to a respective indexed hexagrid within an indexed variable grid.

FIG. 6 depicts a flow diagram of an example method 600 for interpolating soil data, according to one embodiment and scenario.

The method 600 may include collecting/receiving a first plurality of point data values from an agricultural field, each value corresponding to a first point in a variable grid (block 602). For example, a module of the client computing device 102 (e.g., the data collection module 116) may collect the point data from the implement 102. In some embodiments, the remote computing device 106 may receive the point data from the client computing device.

The first plurality of point data may be generated by the implement 104, for example, sampling a planting region of the agricultural field. As noted, the sampling may include collecting soil samples for later analysis and/or onboard sampling (e.g., using a soil sampling probe). The first plurality of point data values may include a soil pH value, an organic matter content, soil texture, cation-exchange capacity, sand/soil/clay characterizations, etc. Those of ordinary skill in the art will appreciate that the collection/analysis of other data is envisioned.

The first plurality of point data values may represent the respective point data values sampled at a given hexagrid (e.g., the hexagrid 508 of FIG. 5). The given hexagrid may be indexed relative to a variable grid (e.g., the variable grid 200 of FIG. 2 and/or the variable grid 400 of FIG. 4). The given hexagrid may correspond to, for example, one of the hexagrids depicted in the subset of hexagrids 406 of FIG. 4 and/or the hexagrid cell 304 of FIG. 3. As discussed above, indexing hexagrid relative to the variable grid advantageously allows the present techniques to reference the hexagrids for assigning a location to machine data and to apply product to a particular location within the field during the product application stage. Further, tiling the field using hexagonal grid shapes advantageously allows the present techniques to achieve a more efficient field tiling.

The method 600 may include collecting a second plurality of point data values from an agricultural field, each value of the second plurality corresponding to a second point in a variable grid (block 604). The second plurality of point data may correspond to a planting (i.e., agricultural) or non-planting region (e.g., a boundary, a waterway, a road, etc.). The second plurality of point data may include a soil pH value, an organic matter content, soil texture, cation-exchange capacity, sand/soil/clay characterizations, etc.

The method 600 may include generating a third plurality of point data values by interpolating each of the first plurality of point data values and each of the second plurality of point data values (block 606). For example, the method 600 may include a pair-wise comparison of the pH value from the first plurality of point data with the pH value from the second plurality of point data and/or a pair-wise comparison of the CEC value of the first plurality of point data with the CEC value of the second plurality of point data. Any number of such pairwise comparisons may be performed by the method 600 with respect to hexagrids within a variable grid. For example, multiple values of the hexagrid point $F_{n+1,j+1}$ of the subset of hexagrids 406 of FIG. 4 may be compared with the corresponding values of neighboring hexagrids $F_{n,j+1}$, $F_{n+1,j}$, $F_{n+2,j}$, $F_{n+2,j+1}$, $F_{n+1,j+2}$; and $F_{n+2,j+2}$.

It will be appreciated by those of skill in the art that in some cases, point data values may not be interpolatable, such as when the first plurality of point data and the second plurality of point data include disjoint data. For example, the first plurality of point data may correspond to a soil sample, whereas the second plurality of point data corresponds to a non-arable boundary region. In such cases, the interpolation method 600 may include imputing values from surrounding cells into the second plurality of point data. In some embodiments, the method 600 may mark the second plurality of point data as corresponding to a non-boundary by assigning a type attribute to the second plurality of point data. In still further embodiments, the interpolation method 600 may include applying a kriging interpolation technique to the first plurality of point data and the second plurality of point data. In some embodiments, the method 600 may include applying an inverse distance weighted and/or spatial copula interpolation technique. Those of ordinary skill in the art will appreciate that other interpolation techniques may be selected (e.g., inverse of distance, inverse of square distance, etc.).

In some embodiments, the method 600 may include interpolating the first plurality of point data and the second plurality of point data so as to avoid interpolation of any points lying within, or outside of, one or more geofenced regions. In some embodiments, the method 600 may apply a smoothing function for points that are outside of or within the geofenced area. For example, the method 600 may perform an interpolation using a default value, an average value or an average selected from a distribution for points lying within/outside of the geofenced region. The geofenced region of the method 600 may correspond to arable portions of the agricultural field, in some embodiments. In other embodiments, the geofenced regions may rope off non-agricultural fields from analysis, such as waterways, application begin/end zones, wells, driveways, roads, etc.

In some embodiments, the method 600 may interpolate only those values that correspond to boundaries, and/or boundaries of a given type (e.g., only waterways). In some embodiments, the method 600 may interpolate all points so that, for example, point data values between hexagrid cells may be generated.

As discussed herein, the method 600 may improve over existing techniques that average raw pH values by comparing hydrogen ion concentrations when performing pairwise pH interpolation. Specifically, the method 600 may include generating the third plurality of point data values by computing 1) a first hydrogen concentration value corresponding to the first pH value and 2) a second hydrogen concentration value corresponding to the second pH value. The method 600 may include computing an interpolated hydrogen concentration value by analyzing the first hydrogen concentration value and the second hydrogen concentration value. The method 600 may include converting the interpolated hydrogen concentration value to an interpolated pH value. The interpolated pH value is more accurate than the conventional result, obtained by averaging values expressed in a $\log_{10}$ scale.

The method 600 may include performing the steps of the method 600 repeatedly until each of the hexagrid cells within the variable grid (e.g., all of the indexed hexagrid cells 402 of FIG. 4) are interpolated with respect to neighboring hexagrid cells. The method 600 may include storing the generated third plurality of point data values in a memory (e.g., the memory 142, the database 180, etc.). The method 600 may include generating one or more spatial data files based on the interpolated data. The method 600 may include applying one or more modeling algorithms to the third plurality of point data values (e.g., a variable-rate nitrogen algorithm). The method 600 may include generating an agricultural report based on the generated third plurality of point data values.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112 (*f*).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed:

1. A computer-implemented method for improving interpolation of soil data collected from an agricultural field, comprising:
   (a) generating a field geospatial map layer including (1) a variable grid that subdivides the agricultural field, and (2) boundary information for the variable grid;
   (b) receiving, from a ground-based mobile agricultural implement, a plurality of soil point data values corresponding to the agricultural field, wherein the plurality of soil point data values are associated with a time series of soil point data values for the agricultural field;

(c) assigning each of the plurality of soil point data values and a respective type of each soil point data value to a respective grid index of the variable grid;

(d) generating, via one or more processors, a plurality of interpolated soil point data values by interpolating the plurality of soil point data values, wherein the interpolating includes avoiding interpolation of one or both of (i) points having incompatible data types, and (ii) points separated by boundaries;

(e) storing the plurality of interpolated soil point data values in one or more spatial data files; and (f) generating, based on a comparison of the spatial data files and one or more existing spatial data files associated with the time series of soil point data values, one or both of (i) an updated field assessment report for the agricultural field or (ii) an updated agricultural prescription file for the agricultural field.

2. The computer-implemented method of claim 1, wherein interpolating the plurality of soil point data values includes applying at least one of a kriging interpolation technique, an inverse distance weighted interpolation technique or a spatial copula interpolation technique.

3. The computer-implemented method of claim 1, wherein the variable grid includes one or more geofenced regions, and wherein interpolating the plurality of soil point data values includes one or both of (i) preventing interpolation of the geofenced regions, and (ii) limiting the interpolating to the geofenced regions.

4. The computer-implemented method of claim 3, wherein the one or more geofenced regions include at least one of a waterway, a begin or end application zone, a well, a driveway, or a road.

5. The computer-implemented method of claim 1, wherein generating the plurality of interpolated soil point data values includes computing a plurality of hydrogen concentration values corresponding to respective pH values, and further comprising: computing an interpolated hydrogen concentration value by processing the plurality of hydrogen concentration values.

6. The computer-implemented method of claim 1 wherein the variable grid corresponds to a plurality of hexagrids.

7. The computer-implemented method of claim 1, further comprising:
processing the interpolated soil point data values using a model to generate an agricultural field assessment report.

8. A computing system for improving interpolation of soil data collected from an agricultural field, comprising:
one or more processors; and
one or more memories having stored thereon instructions that, when executed by the one or more processors, cause the computing system to:
generate a field geospatial map layer including (1) a variable grid that subdivides the agricultural field, and (2) boundary information for the variable grid;
receive, from a ground-based mobile agricultural implement, a plurality of soil point data values corresponding to the agricultural field, wherein the plurality of soil point data values are associated with a time series of soil point data values for the agricultural field;
assign each of the plurality of soil point data values and a respective type of each soil point data value to a respective grid index of the variable grid;
generate, via one or more processors, a plurality of interpolated soil point data values by interpolating the plurality of soil point data values, wherein the interpolating includes avoiding interpolation of one or both of (i) points having incompatible data types, and (ii) points separated by boundaries;
store the plurality of interpolated soil point data values in one or more spatial data files; and
generate, based on a comparison of the spatial data files and one or more existing spatial data files associated with the time series of soil point data values, one or both of (i) an updated field assessment report for the agricultural field or (ii) an updated agricultural prescription file for the agricultural field.

9. The computing system of claim 8, the one or more memories storing further instructions that, when executed by the one or more processors, cause the computing system to:
apply at least one of a kriging interpolation technique, an inverse distance weighted interpolation technique or a spatial copula interpolation technique.

10. The computing system of claim 8, the one or more memories storing further instructions that, when executed by the one or more processors, cause the computing system to one or both of (i) prevent interpolation of geofenced regions within the agricultural field, and (ii) limit the interpolation to geofenced regions within the agricultural field.

11. The computing system of claim 10, wherein the one or more geofenced regions include at least one of a waterway, a begin or end application zone, a well, a driveway, or a road.

12. The computing system of claim 8, the one or more memories storing further instructions that, when executed by the one or more processors, cause the computing system to compute an interpolated hydrogen concentration value by processing a plurality of hydrogen concentration values.

13. The computing system of claim 8, wherein the variable grid corresponds to a plurality of hexagrids.

14. The computing system of claim 8, the one or more memories storing further instructions that, when executed by the one or more processors, cause the computing system to process the interpolated soil point data values using a model to generate an agricultural field assessment report.

15. A non-transitory computer readable medium containing program instructions that when executed by a computer, cause the computer to:
generate a field geospatial map layer including (1) a variable grid that subdivides an agricultural field, and (2) boundary information for the variable grid;
receive, from a ground-based mobile agricultural implement, a plurality of soil point data values corresponding to an agricultural field, wherein the plurality of soil point data values are associated with a time series of soil point data values for the agricultural field;
assign each of the plurality of soil point data values and a respective type of each soil point data value to a respective grid index of the variable grid;
generate, via one or more processors, a plurality of interpolated soil point data values by interpolating the plurality of soil point data values, wherein the interpolating includes avoiding interpolation of one or both of (i) points having incompatible data types, and (ii) points separated by boundaries;
store the plurality of interpolated soil point data values in one or more spatial data files; and
generate, based on a comparison of the spatial data files and one or more existing spatial data files associated with the time series of soil point data values, one or both of (i) an updated field assessment report for the agricultural field or (ii) an updated agricultural prescription file for the agricultural field.

16. The non-transitory computer readable medium of claim 15, containing further program instructions that when executed, cause the computer to:
   apply at least one of a kriging interpolation technique, an inverse distance weighted interpolation technique or a spatial copula interpolation technique.

17. The non-transitory computer readable medium of claim 15, containing further program instructions that when executed, cause the computer to:
   one or both of (i) prevent interpolation of geofenced regions within the agricultural field, and (ii) limit the interpolation to geofenced regions within the agricultural field.

18. The non-transitory computer readable medium of claim 15, containing further program instructions that when executed, cause the computer to:
   compute an interpolated hydrogen concentration value by processing a plurality of hydrogen concentration values.

19. The non-transitory computer readable medium of claim 15, wherein the variable grid corresponds to a plurality of hexagrids.

20. The non-transitory computer readable medium of claim 15, containing further program instructions that when executed, cause the computer to:
   process the interpolated soil point data values using a model to generate an agricultural field assessment report.

* * * * *